(12) United States Patent
Lin

(10) Patent No.: US 8,746,951 B2
(45) Date of Patent: Jun. 10, 2014

(54) PORTABLE ELECTRONIC APPARATUS

(75) Inventor: Ying-Pu Lin, Taichung (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 98 days.

(21) Appl. No.: 13/457,458

(22) Filed: Apr. 26, 2012

(65) Prior Publication Data

US 2013/0201718 A1      Aug. 8, 2013

(30) Foreign Application Priority Data

Feb. 8, 2012   (TW) .............................. 101202268 A

(51) Int. Cl.
*F21V 7/04* (2006.01)
(52) U.S. Cl.
USPC ........... 362/634; 362/633; 362/612; 362/613; 362/632
(58) Field of Classification Search
USPC .................. 362/633, 602, 612, 613, 632, 634
See application file for complete search history.

(56) References Cited

U.S. PATENT DOCUMENTS

| 7,488,105 | B2 * | 2/2009 | Kuo | 362/633 |
| 7,810,984 | B2 * | 10/2010 | Cha et al. | 362/634 |
| 8,147,115 | B2 * | 4/2012 | Kiyose | 362/633 |
| 8,475,027 | B2 * | 7/2013 | Cho et al. | 362/606 |
| 2008/0180972 | A1 * | 7/2008 | Sakamoto et al. | 362/613 |
| 2009/0128730 | A1 * | 5/2009 | Hsu et al. | 349/58 |

FOREIGN PATENT DOCUMENTS

TW      201102717 A1    1/2011

\* cited by examiner

*Primary Examiner* — Ismael Negron
*Assistant Examiner* — William N Harris
(74) *Attorney, Agent, or Firm* — Winston Hsu; Scott Margo

(57) ABSTRACT

A portable electronic apparatus includes a display panel, an outer casing, a backlight module disposed between the display panel and the outer casing, and an outer frame disposed on the display panel for fixing the display panel and the backlight module with the outer casing. A frame structure is formed on the outer casing and has a pillar and a slot. The backlight module includes a light guide plate, plural light emitting units disposed at a side of the light guide plate, and a cover member. The cover member is disposed on the outer casing corresponding to the light emitting units and has a bending hook portion and a holding board portion for holding the display panel. The holding board portion has a hole for engaging with the pillar when the bending hook portion hooks the slot, so that the cover member can cover the light emitting units.

8 Claims, 5 Drawing Sheets

PORTABLE ELECTRONIC APPARATUS

BACKGROUND OF THE INVENTION

1. Field of the Invention

The present invention relates to a portable electronic apparatus, and more specifically, to a portable electronic apparatus utilizing a cover member to be connected to a frame structure of an outer casing for covering light emitting units.

2. Description of the Prior Art

With development of electronic technology, a portable electronic apparatus has made great progress on portability, such as a notebook, a tablet computer, or a mobile phone. In order to reduce the overall thickness of the portable electronic apparatus for a user to carry conveniently, a slim design is usually applied to the key components (e.g. a liquid crystal display module) of the portable electronic apparatus in size.

Generally speaking, in an assembly process of a liquid crystal display module, first of all, a back plate is utilized to support backlight components (e.g. a light guide plate, a reflection sheet and so on) and a plastic frame is utilized to support film components (e.g. a lens film, a diffuser film and so on). Subsequently, an outer frame is utilized to contain a display panel and the said components cooperatively with an outer casing of the portable electronic apparatus, so as to complete the assembly process of the liquid crystal display module.

As mentioned above, the said frame structures (i.e. the back plate and the plastic frame) are needed to position and fix the related components during the assembly process of the liquid crystal display module. Thus, in the prior art, a common slim design for the liquid crystal display module is to omit the back plate and utilize the plastic frame to be directly fixed onto the outer casing of the portable electronic apparatus. Please refer to FIG. 1, which is an exploded diagram of a display module 10, an outer frame 12 and an outer casing 14 according to the prior art. As shown in FIG. 1, the display module 10 is disposed between the outer frame 12 of the portable electronic apparatus and the outer casing 14. The display module 10 includes a panel device 16 and a plastic frame 18. The panel device 16 is disposed on the plastic frame 18. Next, please refer to FIG. 2, which is an assembly diagram of the plastic frame 18 in FIG. 1 being disposed on the outer casing 14. As shown in FIG. 2, after the panel device 16 is installed on the plastic frame 18, the plastic frame 18 can be fixed to the outer casing 14 (e.g. utilizing screws). Subsequently, the outer frame 12 in FIG. 1 is utilized to fix the panel device 16 cooperatively with the outer casing 14, so as to complete assembly of the display module 10 on the portable electronic apparatus. To be noted, besides the aforesaid design in which the plastic frame is directly fixed onto the outer casing for omitting the back plate, the prior art can also utilize another design in which the plastic frame is integrally formed on the outer casing for simplifying the assembly process of the display module.

However, due to limitation of assembly demands of backlight components (e.g. a light bar and a light guide plate) in the panel device, the major drawback of the aforesaid design is that a light cover for reflecting light back to the light guide plate can not be disposed on the light bar. Thus, light leakage may occur accordingly so as to cause a hot-spot problem and reduce efficiency of the light bar in use of light. Furthermore, in the aforesaid design, since there is no light cover to clamp the light guide plate, detachment of the light guide plate occurs easily when the portable electronic apparatus receives impact from the outer environment. In addition, deformation of the light guide plate may also occur if the portable electronic apparatus is in an environment of an excessively-high temperature. The aforesaid conditions may greatly influence the display quality of the display module.

SUMMARY OF THE INVENTION

The present invention provides a portable electronic apparatus. The portable electronic apparatus includes a display panel, an outer casing, a backlight module, and an outer frame. The outer casing has a frame structure formed thereon. The frame structure has a pillar and a slot. The backlight module is disposed between the display panel and the outer casing. The backlight module includes a light guide plate, a plurality of light emitting units, and a cover member. The light guide plate is contained in the frame structure for providing light to the display panel. The plurality of light emitting units is disposed at a side of the light guide plate for emitting light into the light guide plate. The cover member is disposed on the outer casing corresponding to the plurality of light emitting units and has a bending hook portion and a holding board portion for holding the display panel. The holding board portion has a hole for engaging with the pillar when the bending hook portion hooks the slot, so that the cover member can be fixed onto the frame structure to cover the light emitting units. The outer frame is disposed on the display panel for fixing the display panel and the backlight module cooperatively with the outer casing.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
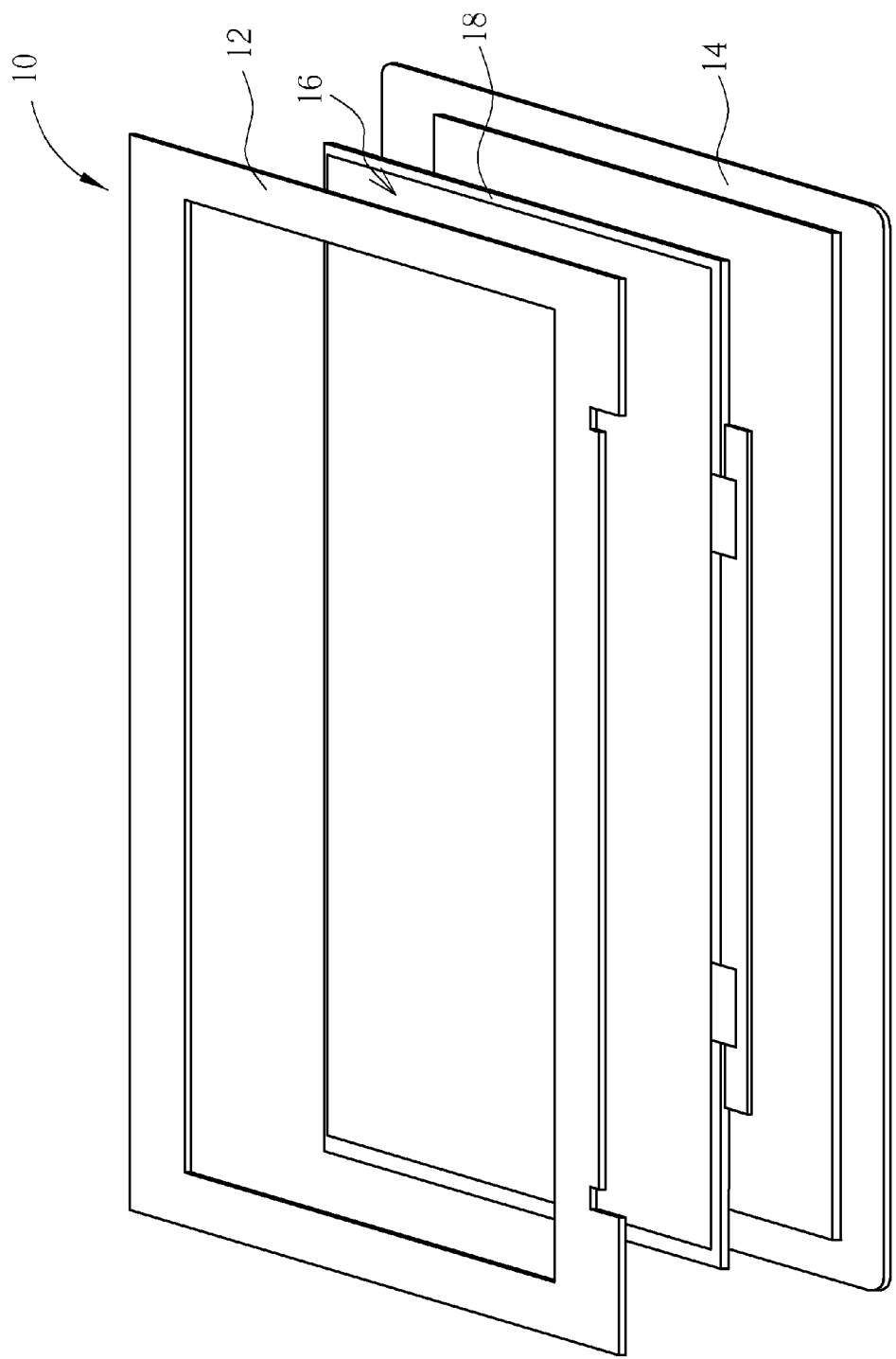
FIG. 1 is an exploded diagram of a display module, an outer frame, and an outer casing according to the prior art.
Figure 2:
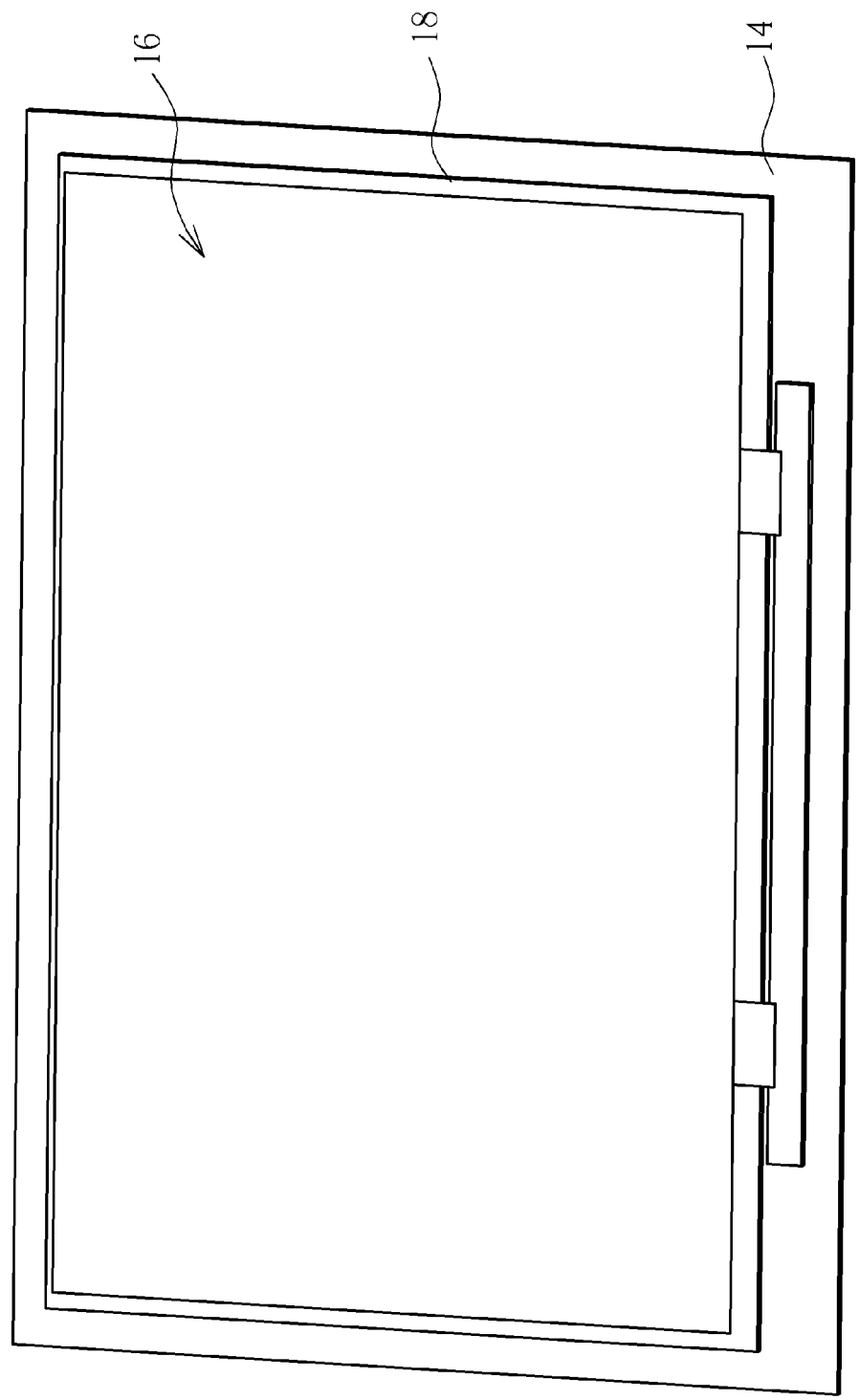
FIG. 2 is an assembly diagram of a plastic frame in FIG. 1 being disposed on the outer casing.
Figure 3:
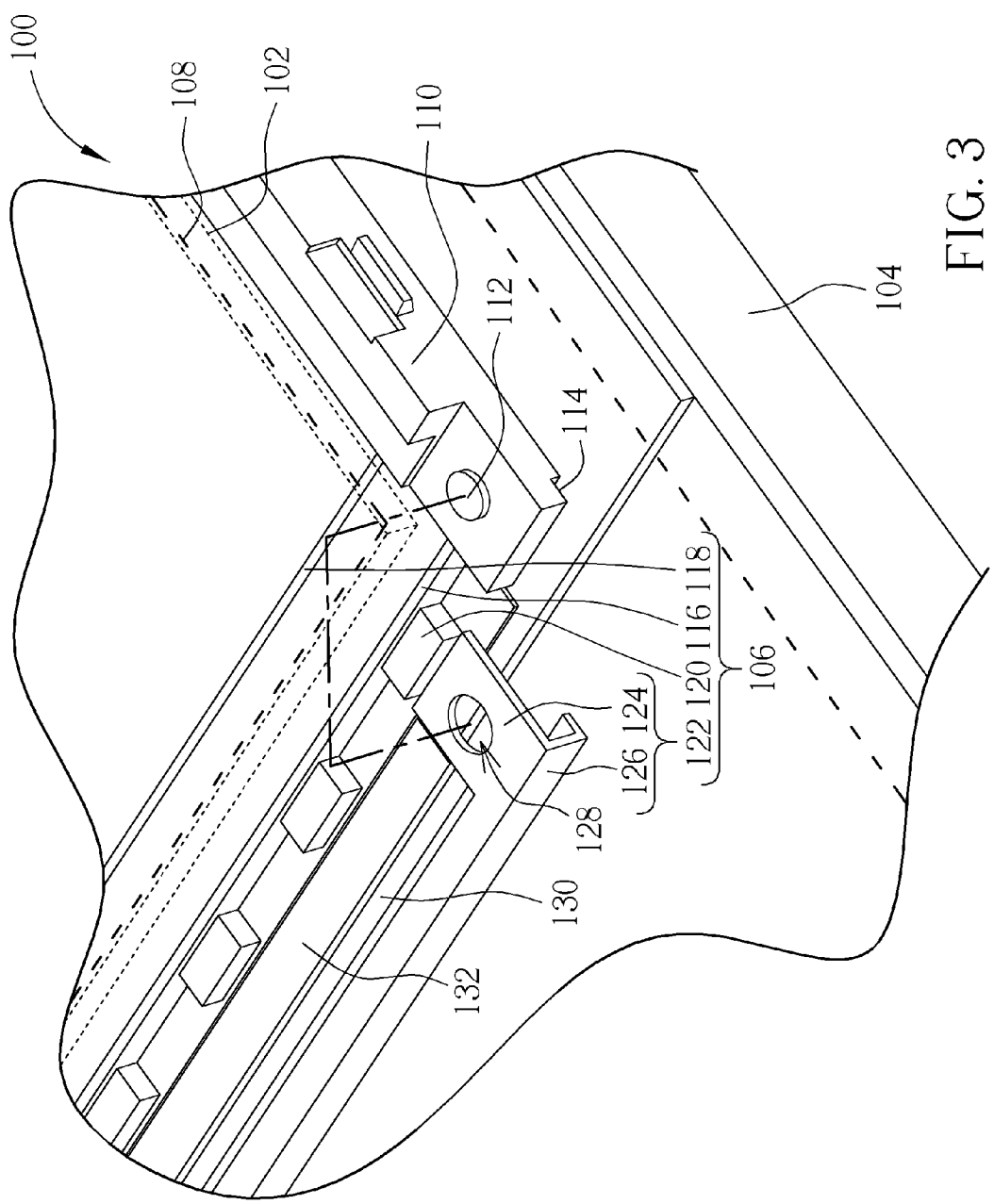
FIG. 3 is a partial enlarged diagram of a portable electronic apparatus according to an embodiment of present invention.

Please refer to FIG. 3, which is a partial enlarged diagram of a portable electronic apparatus 100 according to an embodiment of present invention. As shown in FIG. 3, the portable electronic apparatus 100 includes a display panel 102, an outer casing 104, a backlight module 106, and an outer frame 108. In this embodiment, the portable electronic apparatus 100 is preferably a notebook, but is not limited thereto. In other words, the present invention can be suitable to all portable electronic apparatuses utilizing an outer casing and an outer frame to contain a display panel and a backlight module, such as a tablet computer and a mobile phone. Furthermore, for clearly displaying the structural design of the backlight module 106, the outer frame 108 and the display panel 102 are depicted by dotted lines in FIG. 3. As for the related description of the display panel 102, it is commonly seen in the prior art and therefore omitted herein.

A frame structure 110 is formed on the outer casing 104 for fixing components of the backlight module 106. The frame structure 110 has a pillar 112 and a slot 114. The backlight module 106 is disposed between the display panel 102 and the outer casing 104. The backlight module 106 includes a light guide plate 116, at least one film component 118 (one shown in FIG. 3), a plurality of light emitting units 120, and a cover member 122. The light guide plate 116 is contained in the frame structure 110. The light guide plate 116 is used for providing light with uniform distribution to the display panel 102 for displaying images. The film component 118 is disposed on the light guide plate 116. The film component 118 can be a conventional panel film, such as a lens film or a diffuser film. The plurality of light emitting units 120 is disposed at a side of the light guide plate 116 for emitting light to the light guide plate 116. In this embodiment, each light emitting unit 120 is preferably an LED (Light Emitting Diode), and the plurality of light emitting units 120 form a light bar cooperatively and is disposed on the outer casing 104. The outer frame 108 is disposed on the display panel 102 for fixing the display panel 102 and the backlight module 106 cooperatively with the outer casing 104.

Figure 4:
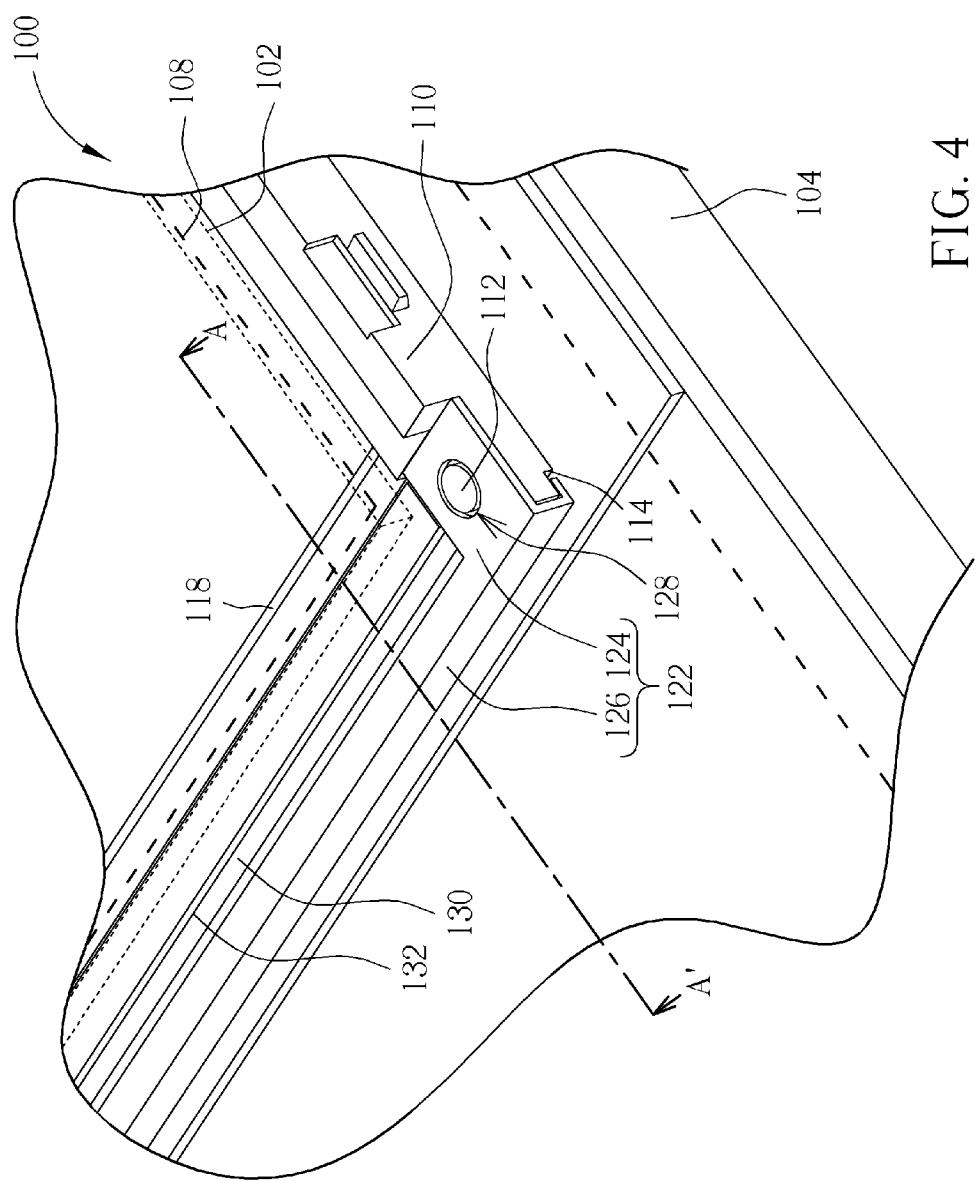
FIG. 4 is an assembly diagram of a cover member in FIG. 3 being fixed to a frame structure.
Figure 5:
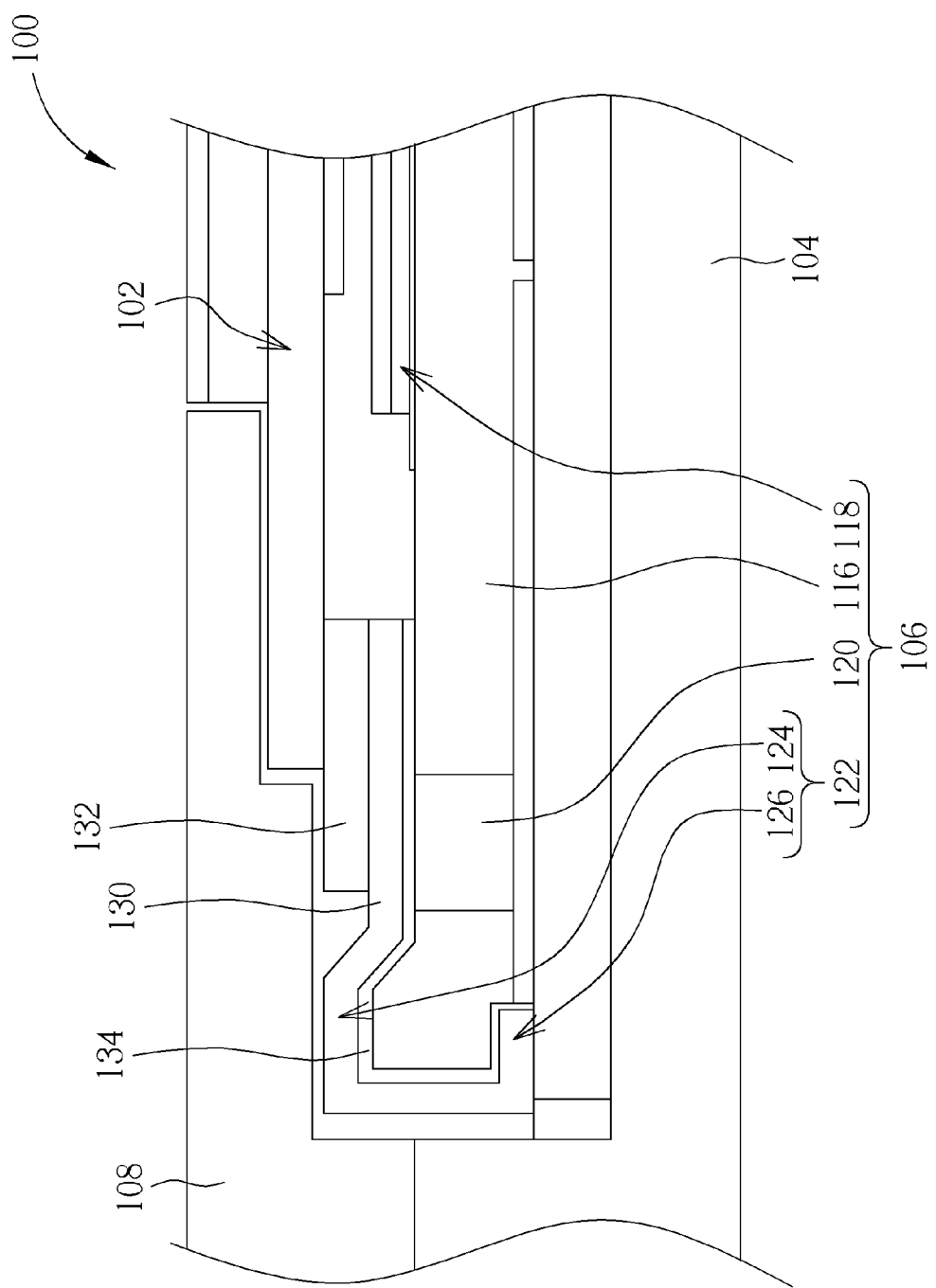
FIG. 5 is a partial sectional diagram of the portable electronic apparatus in FIG. 4 along a sectional line A-A'.

More detailed description for the design of fixing the cover member 122 to the frame structure 110 is provided as follows. Please refer to FIG. 3, FIG. 4, and FIG. 5. FIG. 4 is an assembly diagram of the cover member 122 in FIG. 3 being fixed to the frame structure 110. FIG. 5 is a partial sectional diagram of the portable electronic apparatus 100 in FIG. 4 along a sectional line A-A'. The cover member 122 is disposed on the outer casing 104 corresponding to the plurality of light emitting units 120 and has a hold board portion 124 and a bending hook portion 126. The cover member 122 is preferably made of metal material. The holding board portion 124 is used for holding the display panel 102 and has a hole 128 corresponding to the pillar 122. The bending hook portion 126 is used for hooking the slot 114 of the frame structure 110.

In such a manner, after the light guide plate 116 is contained in the frame structure 110, the bending hook portion 126 of the cover member 122 can be used for hooking the slot 114 of the frame structure 110, and then the hole 128 of the holding board portion 124 can be used for engaging with the pillar 122 of the frame structure 110. As a result, via engagement of the bending hook portion 126 and the slot 114 and engagement of the hole 128 and the pillar 112, the cover member 122 can not only be fixed onto the frame structure 110 steadily (as shown in FIG. 4), but also cover the plurality of light emitting units 120 for preventing light leakage, so as to solve the hot-spot problem above-mentioned in the prior art.

Furthermore, for achieving the purpose that the cover member 122 can clamp the light guide plate 116 cooperatively with the outer casing 104, the holding board portion 124 preferably has a concave clamping structure 130 in this embodiment (as shown in FIG. 5). Accordingly, when the cover member 122 is fixed onto the frame structure 110, the concave clamping structure 130 can be utilized to clamp the light guide plate 116 cooperatively with the outer casing 104 so as to solve the problem that detachment of the light guide plate occurs easily when the portable electronic apparatus receives impact from the outer environment above-mentioned in the prior art.

In addition, the aforesaid design in which the light guide plate 116 is sandwiched by the concave clamping structure 130 and the outer casing 104 can further prevent deformation of the light guide plate 116 when the portable electronic apparatus 100 is in an environment of an excessively-high temperature. To be noted, the concave clamping structure 130 can be an omissible component for simplifying the structural design of the cover member 122. That is, in another embodiment, the present invention can utilize the design in which the concave clamping structure 130 is omitted and the height of the cover member 122 is appropriately decreased to lower the engagement height of the hole 128 and the pillar 112, to make the holding board portion 124 capable of directly clamping the light guide plate 116 with the outer casing 104 after the cover member 122 is fixed onto the frame structure 110.

After the cover member 122 is fixed onto the frame structure 110, the film component 118 can be disposed on the light guide plate 116, and then the holding board portion 124 of the cover member 122 can be utilized to hold the display panel 102. Finally, after the outer frame 108 is disposed on the display panel 102 and is then connected to the outer casing 104 for cooperatively fixing the display panel 102 and the backlight module 106, assembly of the display panel 102, the outer casing 104, the backlight module 106, and the outer frame 108 can be completed accordingly. Furthermore, for increasing the connection strength of the display panel 102 and the holding board portion 124, the cover member 122 can further have a sticking tape 132 in this embodiment. The sticking tape 132 is attached to the concave clamping structure 130 and the display panel 102 (as shown in FIG. 5), so that the display panel 102 can be disposed on the holding board portion 124 more steadily. In addition, the cover member 122 can further have a reflection sheet 134. The reflection sheet 134 is attached to the holding board portion 124 and an inner surface of the bending hook portion 126 corresponding to the plurality of light emitting units 120 (as shown in FIG. 5) for reflecting light back to the light guide plate 116. As a result, efficiency of the portable electronic apparatus 100 in use of light can be further improved.

Compared with the prior art, the present invention utilizes the design in which the bending hook portion of the cover member and the hole of the holding board portion of the cover member are respectively engaged with the slot and the pillar of the frame structure, to fix the cover member above the light emitting units for covering the light emitting units. In such a manner, via the design of utilizing the cover member to be fixed onto the frame structure and cover the light emitting units, the portable electronic apparatus of the present invention can efficiently prevent light leakage to solve the hot-spot problem above-mentioned in the prior art.

Furthermore, via the aforesaid design in which the light guide plate is sandwiched by the cover member and the outer casing, the present invention can further solve the problem that detachment of the light guide plate occurs easily when the portable electronic apparatus receives impact from the outer environment, and prevent deformation of the light guide plate when the portable electronic apparatus is in an environment of an excessively-high temperature. Thus, the assembly reliability and display quality of the portable electronic apparatus can be further improved.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A portable electronic apparatus comprising:
a display panel;
an outer casing having a frame structure formed thereon, the frame structure having a pillar and a slot, the pillar being formed on a top surface of the frame structure, the slot being formed on a bottom surface of the frame structure, and the top surface being opposite to the bottom surface;
a backlight module disposed between the display panel and the outer casing, the backlight module comprising:
 a light guide plate contained in the frame structure for providing light to the display panel;
 a plurality of light emitting units disposed at a side of the light guide plate for emitting light into the light guide plate; and
 a cover member disposed on the outer casing corresponding to the plurality of light emitting units and having a bending hook portion and a holding board portion for holding the display panel, the holding board portion having a concave clamping structure and further having a hole for engaging with the pillar when the bending hook portion hooks the slot, so that movement of the cover member in three axial directions is constrained to make the cover member fixed onto the frame structure to cover the light emitting units and make the concave clamping structure clamp the light guide plate from top to bottom cooperatively with the outer casing; and
an outer frame disposed on the display panel for fixing the display panel and the backlight module cooperatively with the outer casing.

2. The portable electronic apparatus of claim 1, wherein the cover member further has a sticking tape, and the sticking tape is attached to the concave clamping structure and the display panel so as to fix the display panel onto the holding board portion.

3. The portable electronic apparatus of claim 1, wherein the cover member further has a sticking tape, and the sticking tape is attached to the holding board portion and the display panel so as to fix the display panel onto the holding board portion.

4. The portable electronic apparatus of claim 1, wherein the cover member further has a reflection sheet attached to the holding board portion and an inner side of the bending hook portion corresponding to the plurality of light emitting units.

5. The portable electronic apparatus of claim 1, wherein the cover member is made of metal material.

6. The portable electronic apparatus of claim 1 further comprising:
at least one film component disposed between the light guide plate and the display panel.

7. The portable electronic apparatus of claim 1, wherein the portable electronic apparatus is a notebook, a tablet computer, or a mobile phone.

8. The portable electronic apparatus of claim 1, wherein each light emitting unit is an LED (Light Emitting Diode).

* * * * *